United States Patent [19]

Schmidt, Jr.

[11] 4,064,045

[45] Dec. 20, 1977

[54] FILTER CAKE REMOVAL METHOD AND APPARATUS

[75] Inventor: Henry Schmidt, Jr., Hinsdale, Ill.

[73] Assignee: Industrial Filter & Pump Mfg. Co., Cicero, Ill.

[21] Appl. No.: 740,426

[22] Filed: Nov. 10, 1976

[51] Int. Cl.² .............................................. B01D 23/24
[52] U.S. Cl. ...................................... 210/81; 210/332
[58] Field of Search .......................... 210/81, 332, 334

[56] References Cited

U.S. PATENT DOCUMENTS

| | | |
|---|---|---|
| 2,609,101 | 9/1952 | Howland et al. ..................... 210/334 |
| 3,212,643 | 10/1965 | Schmidt, Jr. et al. ................ 210/332 |
| 3,310,171 | 3/1967 | Schmidt, Jr. et al. ............ 210/332 X |
| 3,344,922 | 10/1967 | Kracklauer ...................... 210/332 X |
| 3,814,257 | 6/1974 | Schmidt, Jr. ......................... 210/332 |

Primary Examiner—Frank A. Spear, Jr.
Assistant Examiner—Richard W. Burks
Attorney, Agent, or Firm—Edmond T. Patnaude

[57] ABSTRACT

The moisture content of filter cake removed from filter leaves is reduced by sluicing off peripheral portions of the cakes while the central portions of the cakes are held under compression against the filter leaves, and thereafter removing the remainder of the cakes in a dry discharge operation.

7 Claims, 3 Drawing Figures

FILTER CAKE REMOVAL METHOD AND APPARATUS

The present invention relates in general to a novel method and apparatus for reducing the moisture content of the filter cakes removed from filter leaves in a dry cake discharge, and it relates in particular to an improvement over the filter and method of operation described in U. S. Pat. Nos. 3,708,072 and 3,814,257.

BACKGROUND OF THE INVENTION

The usual way of operating pressure leaf filters employing flexible diaphragms for compressing the cakes on the leaves as disclosed in my said patents is to pressurize the filter chamber with gas to hold the cakes under compression between the diaphragms and the adjacent faces of the filter leaves during the time that the heel flows out of the chamber through a drain port at the bottom. The heel is recycled into the system where it is mixed with the prefilt for later filtration. After the liquid has been drained from the tankchamber pressure is returned to atmospheric to permit the resilient diaphragms to return to their relaxed positions away from the cakes which remain on the faces of the filter leaves. Thereafter the leaves are vibrated to cause the relatively dry filter cakes to separate from the leaves and to drop into a suitable receptacle or the like.

During the time that the filter cakes are being compressed by the diaphragms, the peripheral portions of the cakes continue to build up inasmuch as they are not covered by the diaphragms and liquid flows therethrough. Since these peripheral portions of the cakes are not compressed they have a much greater moisture content than does the remainder of the cakes. In many applications the solids content of this peripheral cake may be no more that about twenty-five percent of the solids content of the compressed part of the cake. While the heel is being removed from the filter chamber the lower part of this relatively wet, peripheral cake drops off and passes out through the drain port with the heel. However, the upper part of this peripheral cake remains on the main cake between the peripheral portions of the leaves and diaphragms after the heel has been removed. The remaining peripheral cake is undesirable for two principal reasons. One, it increases the moisture content of the overall filter cake which is later removed from the filter leaves during the vibration step, and two, it hinders the release of the diaphragms from the cakes.

SUMMARY OF THE INVENTION

Briefly, there is provided in accordance with the present invention a new and improved method and apparatus for removing the noncompressed peripheral cake from the filter leaves in a pressure leaf filter. While the filter chamber is pressurized with gas but before all of the heel has been discharged, the upper edge portions of the filter cakes are sluiced with a liquid, such as water, to remove that portion of the cake which is not under compression. The sluicing liquid and the peripheral cake which is thus removed from the filter leaves flows out of the chamber as part of the heel. Where the present invention is used as part of a sewage filtration system a relatively small quantity of water is used to remove this wet peripheral cake from the upper portions of the leaves. For example, between 0.2 and 0.5 gallon of water per square foot of filter cake area has been successfully used. The cake which is later removed in a dry cake discharge has a moisture content which is substantially reduced by about five to ten percent. Moreover, because the heavy and viscous peripheral cakes have been removed by the sluice step, when the chamber is later depressurized the diaphragms retract and break cleanly away from the compressed cakes. Consequently, a very much shorter period of vibration is required to remove the dry cake from the filter leaves. In some cases this leaf cleaning vibration period has been reduced from eight minutes to fifteen seconds.

GENERAL DESCRIPTION OF THE DRAWING

Further objects and advantages and a better understanding of the present invention can be had by reference to the following detailed description, wherein.

DETAILED DESCRIPTION OF THE INVENTION

Figure 1:
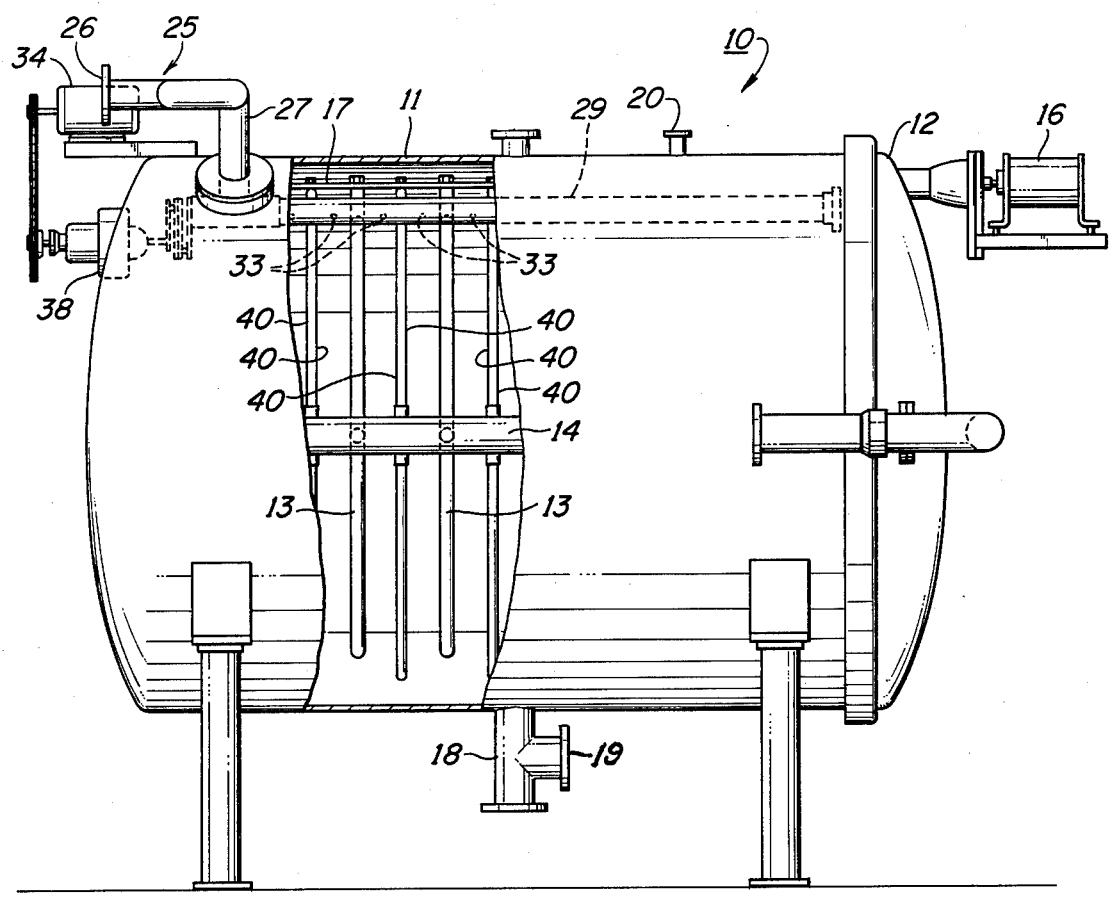
FIG. 1 is an elevational view of a pressure leaf filter used in carrying out the present invention, a portion of the tank being broken away to show the interior thereof.
Figure 2:
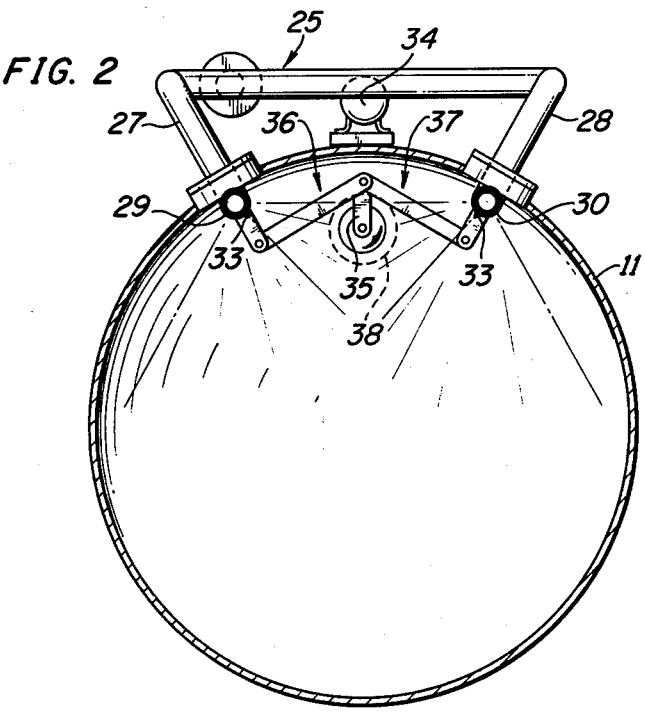
FIG. 2 is a cross-sectional view taken along the line 2—2 in FIG. 1 and particularly showing the sluice mechanism.

Referring to the drawing and particularly to FIGS. 1 and 2, a horizontal pressure leaf filter 10 includes a generally cylindrical tank 11 having a removable cover 12 sealed to the tank to provide a hermetically sealed filter chamber in which a plurality of hollow, perforate filter leaves 13 are mounted in spaced apart vertical positions. The interiors of the filter leaves 13 are connected to a pair of horizontal outlet manifolds 14 which physically support the leaves in the chamber and which carry the clarified liquid from the filter. A vibratory impactor 16 such as described in U.S. Pat. No. 3,212,643 is mounted to the cover 12 and is connected to each of the filter leaves 13 by means of a rigid impactor bar 17. A drain port 18 is provided at the bottom of the tank 11 and as well known in the art is adapted to be connected through suitable valving to the remainder of the system. A gas inlet port 20 is also provided at the top of the tank 11 and as described hereinafter is used to supply gas under pressure to the filter chamber during the sluicing operation and also to permit gas to exit the chamber at the beginning of a filtration cycle. The filter 10 is of the same basic construction as the filter described in Pat. No. 3,212,643 having a liquid inlet 19 at the bottom connected by suitable valving to the remainder of the system.

In order to sluice off the upper peripheral portions of the filter cakes at the end of the cake compression operation in accordance with the present invention, a sluicing mechanism 25 is provided. It includes a sluice liquid inlet port 26 connected to a pair of inlets 27 and 28 which are respectively connected through rotary seals to a pair of sluice headers 29 and 30. The headers 29 and 30 extend above the filter leaf assembly and are provided with spaced apart spray nozzles 33 which respectively direct a spray of sluicing liquid onto the upper peripheral portion of the adjacent filter leaf. The nozzles 33 are respectively located opposite the leaves 13 thereby to direct the sluicing liquid onto the upper peripheral portions of the cakes.

Although stationary nozzles providing a fan-like spray pattern may be used for some applications, where a sticky, tenaceous cake as is common in sewage treatement systems is involved, an oscillating sluice spray is preferable. To that end, an electric motor 34 is mounted to the tank 11 and is drivingly connected to the sluice headers 29 and 30 by means of a crank 35 and two sets of linkages 36 and 37 mounted within the tank 11 at the inner end thereof. A sealing unit 38 is provided to seal the tank at the location where the sluice drive shaft passes through the end wall.

Mounted between the filter leaves 13 are a plurality of pairs of flexible diaphragms 40. The preferred construction and manner of mounting the diaphragms 40 is described in U. S. Pat. No. 3,814,257. When the filter cakes build up on the leaves to a sufficient extent to contact the adjacent diaphragms, the diaphragms are then pressed by hydraulic pressure toward the leaves to compress the filter cakes between the diaphragms and the leaves. As explained in greater detail in U.S Pat. No. 3,814,257, the compression stage occurs automatically while the chamber remains filled with prefilt liquid under pressure. During the compression stage liquid continues to flow into the filter leaves through the peripheral edges of the cakes. As a consequence, the filter cake builds up over the peripheral edges of the cakes, and in some cases, over the peripheral edges of the leaves themselves.

Figure 3:
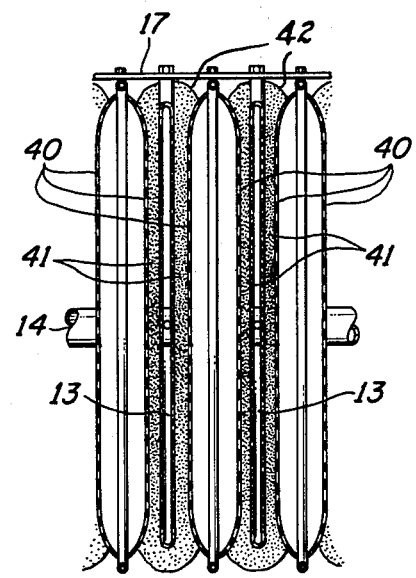
FIG. 3 is a vertically sectioned view of a plurality the filter leaves at the end of the cake compression operation but prior to sluicing.

In FIG. 3 there is illustrated the condition of the filter cake at the end of a typical compression stage. It will be seen that the diaphragms 40 have moved towards the adjacent leaves to compress the central portions of the filter cakes 41 against the leaves 13. The compression stage will generally last for several minutes to more during which time the filter cake continues to grow around the edges of the cakes. As may be seen in FIG. 3 the peripheral portions 42 of the cakes are not compressed and thus have a much lower concentration of solids than do the compressed central portions.

When operating the system in the manner known in the prior art, once the compression cycle is completed the tank is drained under pressure by closing the prefilt inlet to the tank while simultaneously supplying gas under pressure to the top of the tank to maintain the pressure in the tank constant and opening the drain port 18. In this manner the diaphragms are held under compression until the heel is completely drained from the tank. The gas inlet is then closed and the diaphragms retract or pull back away from the filter cakes which remain on the leaves. The leaf assembly is then removed as a unit from the tank and the vibratory impactor is operated to cause the cake to drop off and fall into a suitable receptacle (not shown). When thus operating such filters, it will be found that the lower half of the peripheral cakes separate from the compressed cakes as the heel is drained from the tank. However, the upper halves of the wet peripheral cakes remain on the leaves, and in some cases impair the return of the diaphragms to their relaxed condition.

In accordance with the present invention, after completion of the compression step and while the filter chamber is pressurized, a sluicing liquid is directed onto the upper peripheral portions of the cakes via the sluice headers 29 and 30 and the spray orifices 33. The sluicing operation may be initiated after the tank has been completely drained of the prefilt liquid or it may be initiated when the level of prefilt liquid in the chamber has fallen to about the horizontal diameter of the filter leaves. When operated in the latter manner, the portions of the cakes which are sluiced off fall into the liquid heel and flow out of the tank through the drain port 18 with the heel. The uncompressed cake has a solids density not much greater than that of the prefilt whereby it readily dissolves and breaks up therein as the tank is drained. In addition to removing the peripheral portions of the cakes, the sluice cleans the back sides of the diaphragms which could impair subsequent diaphragm action and result in reduced cake thicknesses.

When using the sluicing system shown in FIGS. 1 and 2, the motor 34 is energized throughout the sluicing operation to cause the sluicing sprays to sweep back and forth across the upper halves of the leaves 13. As may be seen from an inspection of FIG. 2, each of the nozzles traverses a path of about one-hundred twenty degrees and provides the greatest sluicing effect at the tops of the leaves where removal of the wet cakes is most difficult. Moreover, the sluicing spray is directed at the top portion of the cake from only one side at a time thereby to provide improved sluicing. The mechanical arm drive or the headers 29 and 30 together with the angularity of the crank arm 35 provides slowest sluice movement at the ends of the stroke where the distance from the nozzles to the cake is greatest.

In carrying out the invention, sluice pressures of 40 to 60 p.s.i. in excess of chamber pressure provide satisfactory results. Depending upon the cohesiveness and other characteristics of the cake, one or more sweeps of the sluice spray will be required to remove the wet peripheral cake. However, the requirements for the sluice liquid are minimal. For example, in a sewage treatment system I have found one-quarter to one-half gallon of sluicing liquid per square foot of filter area to be sufficient when using the reasonably clarified liquid from the filter itself as the sluicing liquid.

While the present invention has been described in connection with a particular embodiment thereof, it will be understood by those skilled in the art that many changes and modifications may be made without departing from the true spirit and scope of the present invention. Therefore, it is intended by the appended claims to cover all such changes and modifications which come within the true spirit and scope of this invention.

What is claimed:

1. A method of decreasing the moisture content of filter cake removed from a pressure filter element in a dry cake discharge, comprising the steps of
    moving an imperforate compression member against said cake to compress said cake against said filter element,
    then sluicing a peripheral portion of said cake with a liquid to remove said peripheral portion from the remainder of said cake, and
    thereafter removing the remainder of said cake in a dry cake discharge operation.

2. A method according to claim 1 wherein said cake is held under compression between said compression member and said filter element during said step of sluicing.

3. A method according to claim 2 wherein said step of sluicing is carried out using water as the sluicing said step of sluicing is carried out using water as the sluicing liquid.

4. A method according to claim 1 wherein said dry cake discharge operation is effected by vibrating said filter element.

5. A method according to claim 2 wherein said filter element and said compression member are mounted in a filter chamber, and said compression member is held against said cake during said step of sluicing by introducing gas under pressure to said chamber while permitting liquid to flow out of the bottom thereof.

6. A method to claim 1 wherein said filter element is a hollow filter leaf mounted in a vertical position in a pressurizable filter chamber, and wherein only the upper portion of said peripheral portion of said cake is sluiced.

7. A method of obtaining a dry filter cake from a pressure leaf filter in which a plurality of filter leaves are mounted in mutually parallel vertical relationship in a filter chamber, said filter leaves each having oppositely disposed perforate surfaces on which filter cakes are deposited as a liquid being filtered passes therethrough, comprising the steps of compressing said filter cakes against said perforate surfaces by hydraulically forcing imperforate compresssion members against said cakes while a liquid prefilt is in said chamber, supplying gas under pressure to said chamber while simultaneously permitting said prefilt to drain out of the bottom of said chamber thereby to maintain said compression members against said cake as the level of liquid in said chamber drops, spraying sluicing liquid onto the upper peripheral edge portions of said cakes after level has fallen below said upper portion but said chamber still contains a substantial volume of liquid of sluice off said peripheral portions so that they drop into the lower portion of said chamber and are carried out with the prefilt liquid, then interrupting the supply of gas and permitting said compression members to move away from said cakes, and then vibrating said filter leaves to dislodge the compressed filter cakes therefrom.

* * * * *

UNITED STATES PATENT AND TRADEMARK OFFICE
CERTIFICATE OF CORRECTION

PATENT NO. : 4,064,045
DATED : December 20, 1977
INVENTOR(S) : Henry Schmidt, Jr.

It is certified that error appears in the above–identified patent and that said Letters Patent are hereby corrected as shown below:

Column 1, line 21, change "tankchamber" to -tank chamber-;

Column 3, line 32, change "to" to -or-;

Column 4, line 61, delete entire line;

line 62, delete "step of";

Column 5, line 6, after "method" insert -according-;

Column 6, line 9, before "level" insert -said-;

line 11, change "of" (second occurrence) to -to-.

Signed and Sealed this

Thirtieth Day of May 1978

[SEAL]

Attest:

RUTH C. MASON
Attesting Officer

LUTRELLE F. PARKER
Acting Commissioner of Patents and Trademarks